(12) United States Patent
Kirchenbauer et al.

(10) Patent No.: US 9,031,020 B2
(45) Date of Patent: May 12, 2015

(54) USING MULTIPLE RADIOS TO PROVIDE SERVICE ON THE SAME CHANNEL TO SUPPORT A NEW STANDARD WHILE MAINTAINING COMPATIBILITY WITH LEGACY DEVICES

(71) Applicant: Cisco Technology, Inc., San Jose, CA (US)

(72) Inventors: Douglas Paul Kirchenbauer, Medina, OH (US); Neil Robert Diener, Hudson, OH (US); Corey Metsker, Clinton, OH (US); Fred J. Anderson, Lakeville, OH (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 13/627,429

(22) Filed: Sep. 26, 2012

(65) Prior Publication Data

US 2014/0086156 A1    Mar. 27, 2014

(51) Int. Cl.
*H04W 72/04* (2009.01)
*H04W 72/12* (2009.01)
*H04W 88/10* (2009.01)

(52) U.S. Cl.
CPC .......... *H04W 72/1215* (2013.01); *H04W 88/10* (2013.01)

(58) Field of Classification Search
CPC ... H04W 28/04; H04W 72/04; H04W 72/042; H04W 88/08; H04L 5/0007
USPC ........................................ 370/329
See application file for complete search history.

(56) References Cited

U.S. PATENT DOCUMENTS

| | | | |
|---|---|---|---|
| 6,295,450 B1 | 9/2001 | Lyer et al. | |
| 7,058,071 B1 * | 6/2006 | Myles et al. | 370/419 |
| 8,160,036 B2 | 4/2012 | Smith et al. | |
| 8,165,534 B2 | 4/2012 | Meier et al. | |
| 2002/0137521 A1 * | 9/2002 | Kim et al. | 455/453 |
| 2005/0060319 A1 | 3/2005 | Douglas et al. | |
| 2005/0208956 A1 * | 9/2005 | Takagi et al. | 455/464 |
| 2008/0014921 A1 * | 1/2008 | Venkatachalam | 455/425 |
| 2009/0147745 A1 * | 6/2009 | Kawamoto et al. | 370/329 |
| 2010/0027496 A1 * | 2/2010 | Higuchi et al. | 370/329 |
| 2010/0040121 A1 * | 2/2010 | Duerdodt et al. | 375/219 |
| 2010/0285760 A1 | 11/2010 | Blosco et al. | |
| 2011/0072153 A1 * | 3/2011 | Candelaria et al. | 709/237 |
| 2011/0280224 A1 * | 11/2011 | Falck et al. | 370/336 |

FOREIGN PATENT DOCUMENTS

EP          1119137 A1 *  7/2001

OTHER PUBLICATIONS

Cisco: The First 802.11ac Cisco Products, Jun. 28, 2012 Press Release.
Cisco Annouces First Linksys Smart Wi-Fi Router and Universal Connector Powered by Industry's Next-Generation Wireless Technology—802.11ac, Jun. 27, 20012 Press Release.

* cited by examiner

*Primary Examiner* — Charles C Jiang
*Assistant Examiner* — Thad Defauw
(74) *Attorney, Agent, or Firm* — Patterson & Sheridan, LLP

(57) ABSTRACT

In an example embodiment, a wireless device, such as an access point, employs multiple radios that operate on the same or overlapping channels. For example, the wireless device can be upgraded with a new radio that is compatible with a newer protocol to provide service to newer clients that are capable of employing the new protocol, while also providing backwards compatibility to legacy clients.

19 Claims, 5 Drawing Sheets

USING MULTIPLE RADIOS TO PROVIDE SERVICE ON THE SAME CHANNEL TO SUPPORT A NEW STANDARD WHILE MAINTAINING COMPATIBILITY WITH LEGACY DEVICES

TECHNICAL FIELD

The present disclosure relates generally to devices that employ multiple transceivers.

BACKGROUND

Wireless devices, such as access points (APs) can employ multiple slots that allow for the installation of multiple radios. As new wireless protocols are developed, the wireless device can be upgraded by installing a new wireless transceiver. For example, to upgrade an access point (AP) operating with a radio compatible with the 802.11n standard (e.g., to be compatible with the 802.11ac standard), an additional radio that is compatible with the 802.11ac standard can be added (or if the AP has multiple radios compatible with the 802.11n standard at least one of 802.11n radios can be replaced with a radio that is compatible with the 802.11ac standard). Thus, the AP is capable of supporting legacy clients that employ the 802.11n standard while also being capable of supporting new clients that employ the 802.11ac standard.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
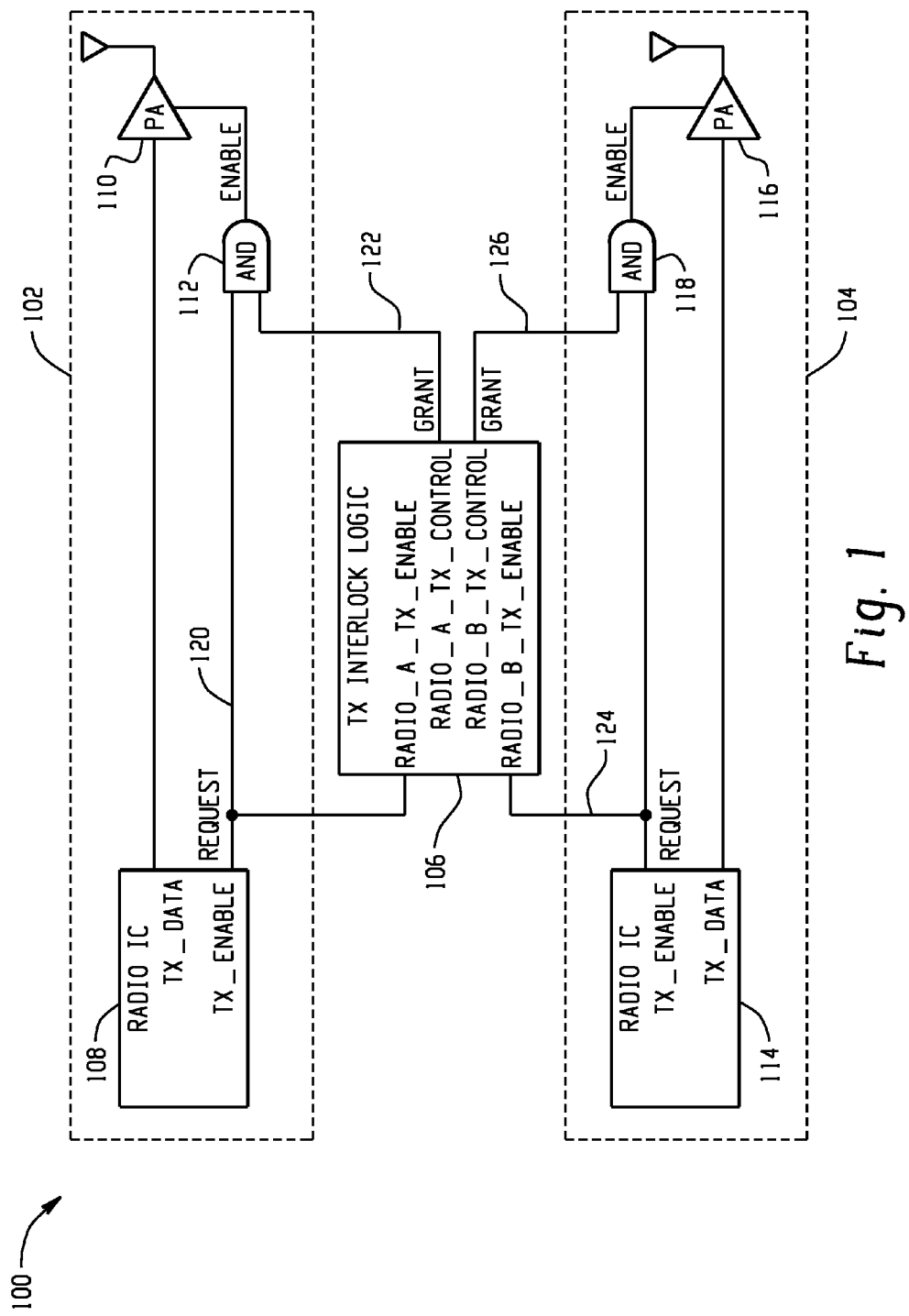
FIG. 1 is a block diagram illustrating an example of a dual radio system with a transmit interlock.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a wireless device, such as an access point that employs multiple radios that operate on the same or overlapping channels. For example, the wireless device can be upgraded with a new radio that is compatible with a newer protocol to provide service to newer clients that are capable of employing the new protocol, while also providing backwards compatibility to legacy clients.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, Carrier-Sense Multiple Access (CSMA) is employed to solve the near/far problem caused by running multiple radios (e.g., a new radio and a legacy radio) on the same or an overlapping channel. For example, in the case of an 802.11n and 802.11ac radio, the 802.11ac radio could run on an 80 MHz channel, and the 802.11n radio would run on the upper or lower 40 MHz of the same channel. CSMA solves the near/far problem, because the inherent CSMA mechanism in 802.11 will prevent one radio from transmitting while the other radio is trying to receive a packet.

In an example embodiment, clients are steered to a radio that is appropriate for their capabilities. For example, in an AP with multiple radios, in order to maintain backwards compatibility for legacy clients, the legacy clients are steered so that they associate with the legacy radio, and newer clients are steered so that they associate with the newer radio. Note that to clients, different radios appear to be separate access points (APs).

In an example embodiment, to steer legacy clients to the legacy radio, a mandatory feature is advertised on the newer radio that will discourage legacy clients from associating. For example, an 802.11ac radio can advertise a very high data rate as mandatory to prevent an 802.11n legacy client from associating with that radio.

In an example embodiment, an AP steers newer clients away from a legacy radio to a radio compatible with the newer client's capabilities. For example, the AP can determine whether a client supports the newer protocol. If the client supports the newer protocol, the AP can refuse to associate, and/or respond to probes, on the legacy radio.

In an example embodiment, an interlock is employed to prevent multiple radios operating on the same or overlapping channels from transmitting at the same time. In particular embodiments, the interlock is a hardware interlock, e.g., implemented in hardware. By using the interlock, the maximum power consumed by the AP is the power for one radio, instead of the sum of the power used by multiple radios.

Moreover, the FCC (Federal Communications Commission) has issued a ruling that if an AP has two radios in the same band, then the output power of both radios should be limited to half of the maximum transmit power so that the sum of transmission power of both radios does not exceed the maximum transmit power. By employing a hardware interlock and ensuring that both radios do not transmit at the same time, the radios can transmit at full transmit power.

FIG. 1 is a block diagram illustrating an example of a dual radio system 100 with transmit interlock logic 106. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

The transmit interlock logic 106 is coupled with a first radio, which may also be referred to herein as "Radio A," 102 that is operable to communicate on a first channel employing a first protocol. The transmit interlock logic 106 is also coupled with a second radio, which may also be referred to herein as "Radio B," 104 that is operable to communicate on a second channel employing a second protocol. In an example embodiment, a portion of the second channel overlaps the first channel. In another example embodiment, the second channel is a sub-channel of the first channel. For example, if the first channel is a 80 MHz channel, the second channel may be a 40 MHz channel that overlaps or shares a portion of the first channel. The transmit interlock logic 106 prevents the first and second radios from transmitting over the medium concurrently.

In the illustrated example, the transmit interlock logic 106 is coupled with a first radio 102 and a second radio 104, however, those skilled in the art can readily appreciate that other embodiments may include any physically realizable number of additional radios.

The first radio 102 comprises a radio integrated circuit (IC) 108 that may suitably comprise media access control (MAC) layer and/or physical layer (PHY) processors and/or processing circuits. The first radio 102 further comprises a power amplifier (PA) 110 and an AND gate 112. The radio IC 108 provides data (TX_DATA) for transmission to PA 110. The radio IC 108 asserts a transmit enable (TX_ENABLE) signal to the transmission interlock logic 106. The transmission interlock logic 106 asserts signal 122 to AND gate 112 to enable PA 110, which allows the first radio 102 to transmit over the medium.

The second radio 104 comprises a radio integrated circuit (IC) 114 that may suitably comprise MAC and/or PHY layer processors and/or processing circuits. The second radio 104 further comprises a power amplifier (PA) 116 and an AND gate 118. The radio IC 114 provides data (TX_DATA) for transmission to PA 118. The radio IC 114 asserts a transmit enable (TX_ENABLE) signal to the transmission interlock logic 106. The transmission interlock logic 106 asserts signal 124 to AND gate 118 to enable PA 116, allowing the second radio 104 to transmit over the medium.

If multiple radios (e.g., radios 102, 104) concurrently want to transmit data, the transmission interlock logic 106 selects one radio to enable transmission while not enabling (or disabling) the other radio or radios. In an example embodiment, the transmit interlock logic 106 selectively enables a radio to transmit based on a fair, round robin scheme. For example, the first time radios 102, 104 want to transmit concurrently, the transmission interlock logic 106 enables the first radio 102 to transmit while making the second radio 104 wait. The next time radios 102, 104 want to transmit concurrently, the transmission interlock logic 106 enables the second radio 104 to transmit while making the first radio 102 wait, and so on. In another example embodiment, the transmit interlock logic 106 selectively enables a radio to transmit based on queue priority level. In yet another example embodiment, the transmit interlock logic 106 randomly selects (e.g., using a pseudorandom function generator) which radio is enabled.

In an example embodiment, the selected radio transmits over the medium. For example, if the transmission interlock 106 selects the first radio 102 to transmit, the PA 110 is enabled, allowing the data to be transmitted over the medium (wireless in this example but those skilled in the art should readily appreciate that the principles described herein are applicable to any medium). Because the PA 116 is not enabled, data sent by the second radio 104 is not being transmitted over the medium.

As will be explained in more detail herein (see, e.g., FIG. 4), in an example embodiment, the transmit interlock logic 106 waits until the current transmit requests have terminated (e.g., de-asserted) before allowing another radio to transmit. In the case where the radios are sending packets with different lengths, this can prevent a radio from sending a partial packet. For example, if the first radio 102 has a short packet to send, and the second radio 104 has a long packet to send, and both radios start transmitting data to their power amplifiers at the same time, if the transmission interlock logic 106 selects the first radio 102 to transmit over the medium, and upon completion of the first radio 102 transmitting allows the second radio 104 to transmit over the medium, the packet sent by the second radio will not include the beginning of the packet that was transmitted while the first radio 102 was transmitting over the medium, which may render the packet unreadable and waste time on the transmission medium. Therefore, the transmit interlock logic 106 waits until the transmission requests (TX_ENABLE 120, 124) for both the first radio 102 and second radio 104 have terminated before allowing the second radio 104 to transmit.

Moreover, if the first radio 102 receives additional packets to send while the transmission interlock 106 is waiting for the second radio 104 to finish sending data, the additional packets can be transmitted over the medium. For example, because the enable signal 122 from the transmission interlock 106 to AND gate 112 is still asserted, when the first radio asserts the TX_ENABLE signal 120, the PA 110 will be re-enabled and the additional packets can be sent over the medium.

As will be described in more detail herein infra, in an example embodiment, the first radio 102 and/or the second radio 104 may suitably comprise a MAC processor and/or processing circuit. The transmit interlock logic 106 is coupled with the MAC processors and/or processing circuits. Thus, the MAC processors and/or processing circuits can determine from a signal asserted by the transmission interlock logic 106 whether the failure in sending a packet is due to a collision or due to the other radio transmitting. If a failure is caused by the other radio transmitting, the MAC processor is operable not to change the backoff time period for sending a frame once transmission is enabled.

In an example embodiment, the first radio 102 and/or second radio 104 are operable to perform carrier sense multiple access (CSMA) prior to transmitting. This can allow a radio to determine whether the other radio is receiving a packet and accordingly, hold off on transmitting. For example, if the first radio 102 is operating on a 80 MHz channel and the second radio 104 is operating on a 40 MHz channel (which for example may be the lower portion of the 80 MHz channel, the upper portion of the 80 MHz channel, or include any portion of the 80 MHz channel), the first radio 102 will perform a CSMA of the first channel prior to transmitting. If the first radio 102 detects activity on the second channel, the first radio 102 will hold off on transmitting to avoid interfering with the second radio's 104 ability to receive data. Similarly, the second radio 104 will perform a CSMA of the second channel and will not transmit if activity is detected on the first channel.

In an example embodiment, the transmit interlock logic 106 is implemented in hardware (e.g., combinational logic circuits). This can facilitate the ability of transmit interlock logic 106 to control the operation of the radios 102, 104. For example, the transmit interlock logic 106 can select which radio to enable on a packet by packet basis.

Figure 2:
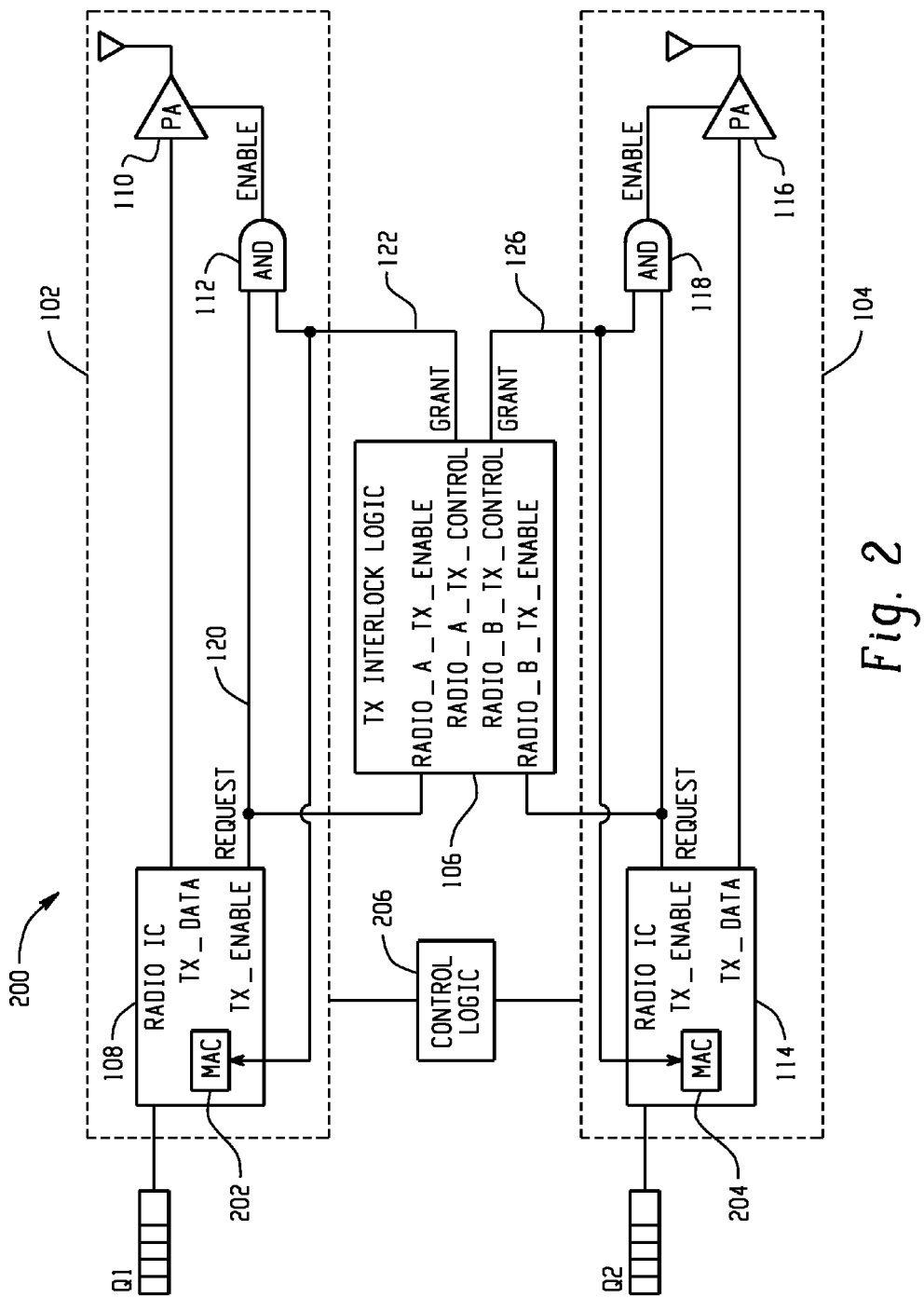
FIG. 2 is a block diagram illustrating an example of a dual radio system with a transmit interlock that is coupled with the radios' media access control (MAC) processors.

FIG. 2 is a block diagram illustrating an example of a dual radio system 200 with transmit interlock logic 106 that is coupled with the radios' (MAC) processors. In the illustrated example, the transmit interlock logic 106 is coupled with MAC 202 of the first radio 102 and MAC 204 of the second radio 104. This can allow the MAC processors 202, 204 to determine whether a failure in receiving a response to a packet was caused by a collision or due to the other radio transmitting. If the failure is due to the other radio transmitting, and not due to a collision, then in an example embodiment, the MAC 202, 204 does not change the backoff time period for channel access.

In the illustrated example, the first radio 102 is coupled with a first queue Q1, and the second radio 104 is coupled with a second queue Q2. In an example embodiment, the transmit interlock logic 106 determines which radio to allow to transmit over the medium based on the priority of the queue. For example, if the first queue Q1 has a higher priority than the second queue Q2, then the transmit interlock logic 106 will enable the first radio 102 to transmit if there are transmission requests from both radios 102, 104. Those skilled in the art can readily appreciate that in particular embodiments, each radio 102, 104 may service a plurality of queues having corresponding priorities. The transmit interlock logic 106 can select the radio 102, 104 servicing the highest priority queue. Moreover, the transmit interlock logic 106 may select the radio on a packet by packet basis. For example, once a first queue has been serviced and has no more packets to send, the radio with the next highest queue is selected.

In the illustrated example, control logic 206 is coupled with the first and second radios 102, 104. The control logic 206 steers clients to the appropriate radio 102, 104. In an example embodiment, to steer legacy clients to the legacy radio, a mandatory feature is advertised on the newer radio that will discourage legacy clients from associating. For example, if the first radio 102 is an 802.11ac, the control logic can have the first radio 102 advertise a very high data rate as mandatory to prevent an 802.11n legacy client from associating with that radio 102.

The control logic 206 can also steer newer clients away from a legacy radio. For example, if the first radio 102 is a newer protocol radio and the second radio 104 is a legacy radio, the control logic 206 can determine whether a client supports the newer protocol. If the client supports a newer protocol, control logic 206 can refuse to associate, and/or respond to probes, on the legacy radio (the second radio 104 in this example).

Figure 3:
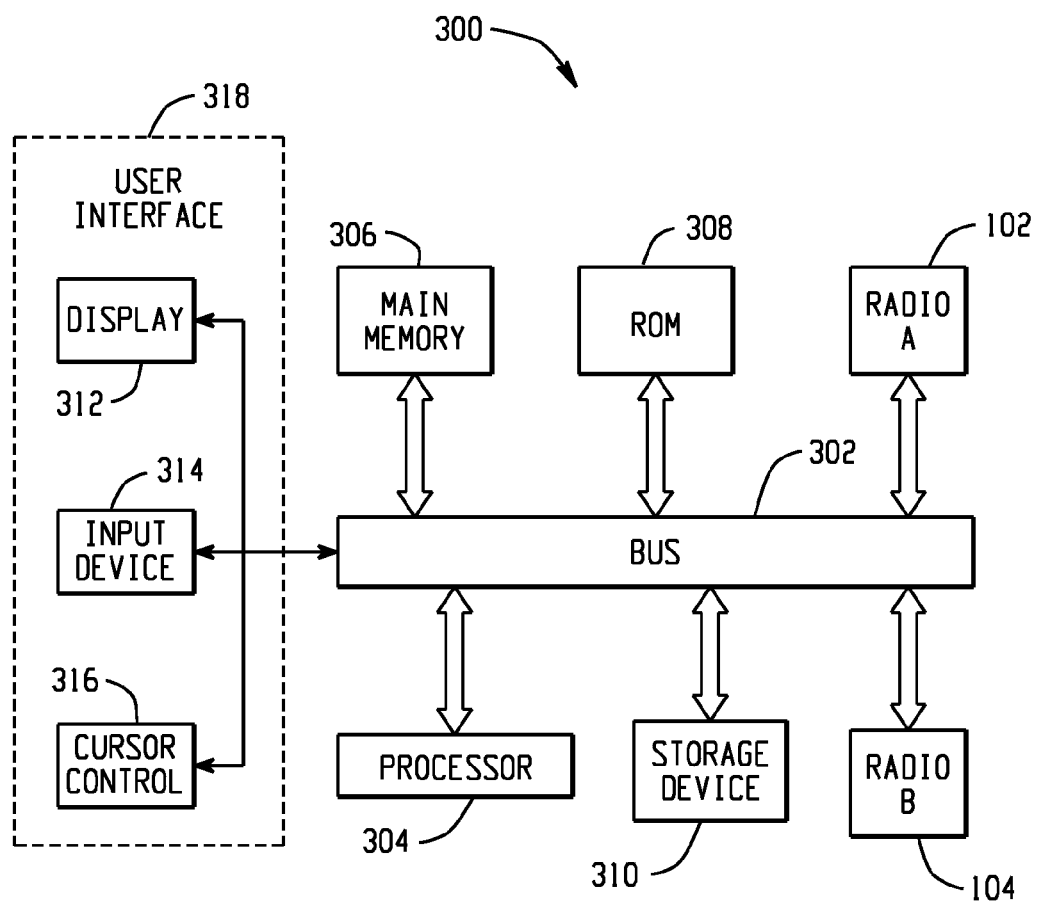
FIG. 3 is a block diagram illustrating a computer system upon which an example embodiment can be implemented.

In an example embodiment, the control logic 206 may suitably comprise a user interface (not shown, see e.g., FIG. 3). The control logic 206 may suitably form a 'virtual radio' with radios 102 and 104. For example, the control logic 206 may present some statistics to an administrator on a per radio basis, such as number of client devices using the first radio (e.g., an 802.11ac radio) 102 and the second radio (e.g., an 802.11n radio) 104. In some cases the control logic 206 can combine the view. For example, the "channel busy" reported by apparatus 200 should include the combination of both radios 102, 104.

FIG. 3 is a block diagram illustrating a computer system 300 upon which an example embodiment can be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, and/or flash storage, is provided and coupled to bus 302 for storing information and instructions.

Optionally, computer system 300 may include a user interface 318 coupled with bus 302. The user interface may include a display 312 such as a cathode ray tube (CRT) or liquid crystal display (LCD), for displaying information to a computer user. An input device 314, such as a keyboard including alphanumeric and other keys is coupled to bus 302 for communicating information and command selections to processor 304. Another type of user input device is cursor control 316, such as a mouse, a trackball, cursor direction keys, and/or a touchscreen for communicating direction information and command selections to processor 304 and for controlling cursor movement on display 312. This input device typically has two degrees of freedom in two axes, a first axis (e.g., x) and a second axis (e.g., y) that allows the device to specify positions in a plane.

An aspect of the example embodiment is related to the use of computer system 300 for using multiple radios to provide service on the same channel to support a new standard while maintaining compatibility with legacy devices. According to an example embodiment, using multiple radios to provide service on the same channel to support a new standard while maintaining compatibility with legacy devices is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include, for example, optical or magnetic disks, such as storage device 310. Volatile media include dynamic memory such as main memory 306. As used herein, tangible media may include any non-transitory media such as a volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Figures 4, 5:
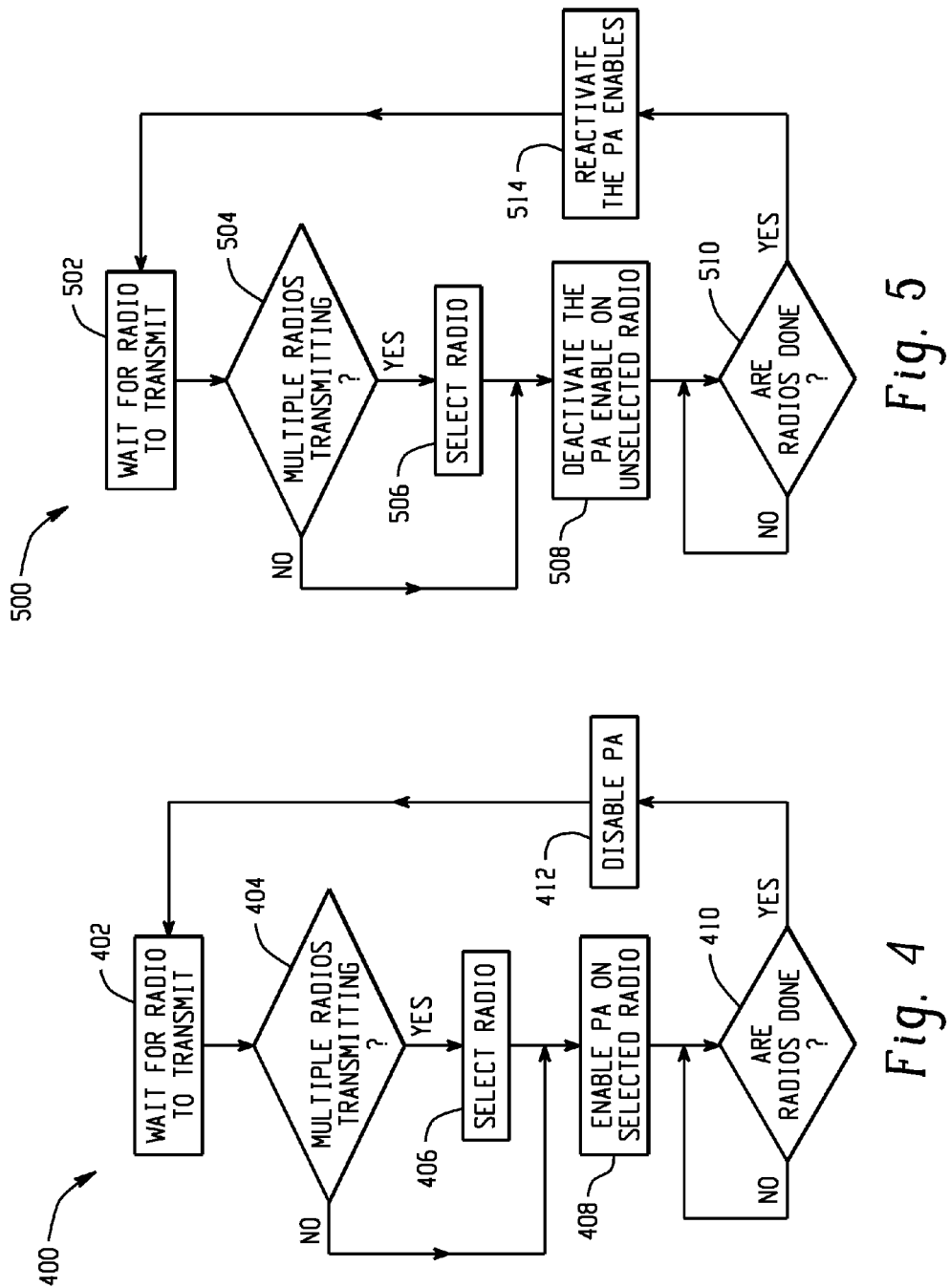
FIG. 4 is a block diagram illustrating an example of a methodology of a system employing a transmit interlock.
FIG. 5 is a block diagram illustrating an example of a methodology employed by a transmit interlock.
Figure 6:
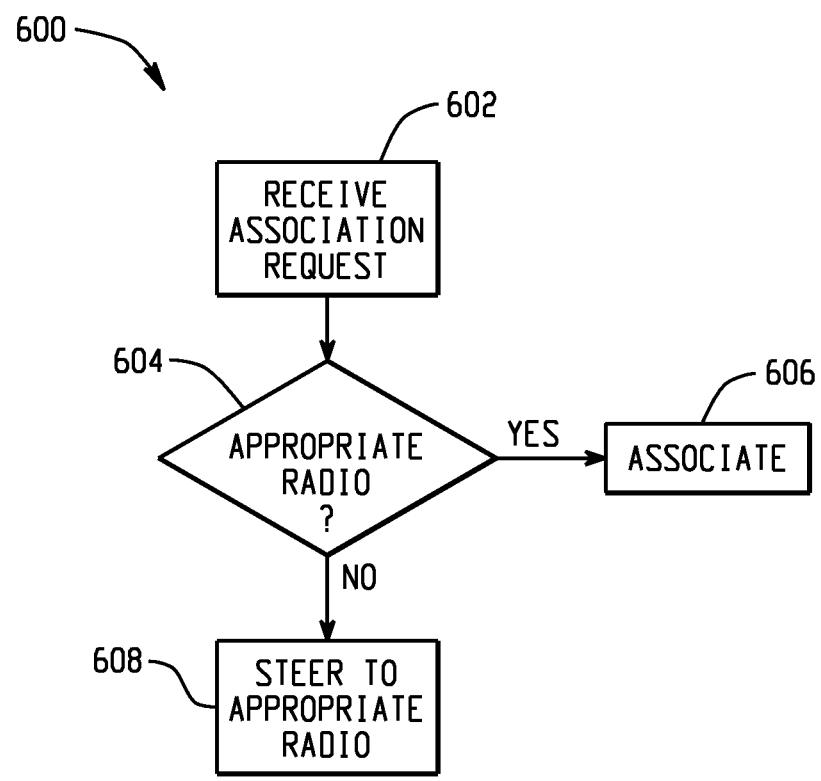
FIG. 6 is a block diagram illustrating a methodology for associating a client with the appropriate radio for the client.

In view of the foregoing structural and functional features described above, methodologies in accordance with example embodiments will be better appreciated with reference to FIGS. 4-6. While, for purposes of simplicity of explanation, the methodologies of FIGS. 4-6 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof.

FIG. 4 is a block diagram illustrating a methodology 400 for implementing a transmit interlock. Methodology 400 may be implemented by transmit interlock logic 106 in FIGS. 1 and 2.

In an example embodiment, methodology 400 can be implemented by a device that has multiple radios operating on the same channel or on overlapping channels. For example, methodology 400, can be implemented by an access point that has one radio that employs a first (e.g., new) protocol and a second radio that employs a second, (e.g., older or legacy) protocol. This can allow the access point to provide service with the new protocol while maintaining backwards compatibility for legacy clients. Moreover, methodology 400 also allows for the radios to transmit at their maximum transmit powers.

At 402, the methodology 400 waits for a request to transmit from a radio. A request may be received from a single radio, or multiple requests may be received concurrently from multiple radios.

At 404, a determination is made whether multiple requests to transmit have been received. Multiple requests may be received simultaneously and/or concurrently. For example, a second request to transmit may be received while a first request to transmit is still being processed.

If, at 404, a determination is made that multiple transmit requests were received (YES), at 406, a radio is selected. The radio for transmission may be selected using any suitable criteria, such as a round robin scheme, queue priority, or a random selection. If, at 404, a determination is made that a single request was received (NO), the transmitter submitting the request is considered the selected radio, and 406 can be skipped.

At 408, the power amplifier (PA) of the radio that will be transmitting is enabled. At 410 a determination is made whether the transmit requests are completed. If there is a radio still transmitting (NO), the method waits until the radio is done transmitting. This prevents a radio from transmitting a partial packet (for example, if the selected radio is sending a short packet and the unselected radio is sending a long packet, waiting until both radios are done transmitting (e.g., the transmit requests are de-asserted) prevents the unselected (second in this example) from sending a partial packet (e.g., the longer packet minus the time that the first radio was sending). If the radios are done transmitting (YES), the power amplifier of the radio that was transmitting is disabled as indicated at 412. Processing returns to 402 to wait for the next request.

As those skilled in the art can readily appreciate, methodology 400 can be implemented on a packet by packet basis. For example, the power amplifier may be enabled for a single frame at 410, and 412, 404, 408, and 410 can be repeated until all frames have been transmitted.

FIG. 5 is a block diagram illustrating an example of a methodology 500 employed by a transmit interlock, such as transmit interlock 106 in FIGS. 1 and 2. In an example embodiment, methodology 500 can be implemented by a device that has multiple radios operating on the same channel or on overlapping channels. For example, methodology 500, can be implemented by an access point that has one radio that employs a first (e.g., new) protocol and a second radio that employs a second (e.g., older or legacy) protocol. This can allow the access point to provide service with the new protocol while maintaining backwards compatibility for legacy clients. Moreover, methodology 500 also allows for the radios to transmit at their maximum transmit powers.

At 502, the methodology 500 waits for a radio (or transmitter) to begin transmitting. For example, the radio may assert a transmit enable (TX_ENABLE) as illustrated in FIGS. 1 and 2.

At 504, a determination is made whether multiple requests to transmit were received. Multiple requests may be received simultaneously and/or concurrently. For example, a second request to transmit may be received while a first request to transmit is still being processed.

If, at 504, a determination was made that multiple transmit requests were received (YES), at 506 a transmitter is selected. Any suitable criteria, such as a round robin scheme, queue priority, or a random selection may be employed for selecting the selected radio. If, at 504, a determination is made that a single request was received (NO), the transmitter submitting the request is considered the selected radio, and 506 can be skipped.

At 508, the power amplifiers of the unselected radios are deactivated. For example, in FIGS. 1 and 2, the GRANT signal to the AND gates coupled with the unselected radio is de-asserted, which de-asserts the ENABLE signal to the unselected radios.

At 510, a determination is made whether all radios are done transmitting. If there is a radio still transmitting (NO), the method waits until the radio is done transmitting. This prevents a radio from transmitting a partial packet, for example if the selected radio is sending a short packet and the unselected radio is sending a long packet, waiting until both radios are done transmitting (e.g., the transmit requests are de-asserted) prevents the unselected transmitter from sending a partial packet (e.g., the longer packet minus the length of the packet sent by the selected transmitter). After all of the radios are done transmitting (YES), at 514 the enable signals to the unselected transmitters are re-enabled. The methodology 500 returns to 502 to wait for the next transmit request.

FIG. 6 is a block diagram illustrating a methodology 600 for associating a client with the appropriate radio for the client. Methodology 600 may be implemented by computer system 300 in FIG. 3.

In an example embodiment, methodology 600 can be implemented by a device that has multiple radios operating on the same channel or on overlapping channels. For example, methodology 600 can be implemented by an access point that has one radio that employs a first (e.g., new) protocol and a second radio that employs a second, (e.g., older or legacy) protocol. This can allow the access point to provide service with the new protocol while maintaining backwards compatibility for legacy clients. For example, methodology can be implemented by apparatus 100 (FIG. 1) apparatus 200 (FIG. 2), and/or computer system 300 (FIG. 3).

At 602, a probe and/or association request is received from a client. At 604, a determination is made whether the request was received on a radio appropriate for the client. For example, if the device has a first radio that supports a first (e.g.

new) protocol, and a second radio that supports a second (e.g., old or legacy) protocol, a determination is made whether the radio receiving the request is the appropriate radio for the request. For example, if the client is capable of supporting the first protocol and is communicating with the first radio (YES), association of the client with the first radio continues at 606. However, if the client is not capable of supporting the first protocol, but can support the second protocol (NO), then the client is steered to the appropriate (second in this example) radio at 608. As another example, if the client is capable of supporting both the first and second protocols, but the first protocol is preferred, if the client is attempting to associate with the first radio (YES), association of the client with the first radio continues at 606; however, if the client is attempting to associate with the second radio (NO), the client is steered to the appropriate radio at 608.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a first radio operable to communicate on a first channel employing a first protocol;
   a second radio operable to communicate on a second channel employing a second protocol, wherein at least a portion of the first and second channels overlap; and
   a transmit interlock coupled with the first radio and the second radio;
   wherein the transmit interlock includes an input operable to receive a first transmit request signal from the first radio and to receive a second transmit request signal from the second radio;
   wherein the transmit interlock is operable to prevent the first and second radios from transmitting over a medium concurrently by selectively enabling or disabling the radios responsive to receiving the first and second transmit request signals;
   wherein the transmit interlock is operable, when receiving both the first transmit request from the first radio and the second transmit request from the second radio, to enable the first radio to transmit over the medium and to wait until after the first and second transmit requests from the first and second radios have both been de-asserted before selectively enabling the second radio to transmit responsive to a receiving the second transmit request from the second radio.

2. The apparatus set forth in claim 1, wherein the transmit interlock selectively enables the first and second radios to transmit over the medium based on a round robin scheme.

3. The apparatus set forth in claim 1, wherein:
   the first radio services at least one first queue having a first priority level and the second radio services at least one second queue having a second priority level; and
   the transmit interlock selectively enables a one of the first or second radios to transmit over the medium based on a relative queue priority level between the first and second priority levels.

4. The apparatus set forth in claim 1, wherein the transmit interlock is operable to randomly select a radio from among the first and second radios to transmit over the medium.

5. The apparatus set forth in claim 1, wherein:
   the first radio further comprises a media access control (MAC) processor;
   the transmit interlock is coupled with the MAC processor; and
   the MAC processor is operable, responsive to receiving a signal from the transmit interlock indicating the first radio is transmitting, to not chan e a backoff time period for sending a frame once transmission sending the frame is enabled.

6. The apparatus set forth in claim 1, wherein the second channel is a sub-channel of the first channel.

7. The apparatus set forth in claim 1, wherein:
   the second radio performs a carrier sense multiple access of the second channel prior to transmitting; and
   the second radio does not transmit while the second channel is busy.

8. The apparatus set forth in claim 1, further comprising:
   control logic coupled with the first and second radios;
   wherein the control logic sends a signal on the first channel via the first radio advertising a mandatory feature supported by the first protocol that is not compatible to a client that supports the second protocol but not the first protocol.

9. The apparatus set forth in claim 1, further comprising:
   control logic coupled with the first and second radios;
   wherein the control logic is operable to determine whether a client communicating with the first radio supports the second protocol;
   wherein the control logic is operable to suppress probe responses to the client responsive to determining that the client supports the second protocol.

10. The apparatus set forth in claim 1, further comprising:
    control logic coupled with the first and second radios;
    wherein the control logic is operable to determine whether a client communicating with the first radio supports the second protocol;
    wherein the control logic is operable to prevent the client from associating with the first radio responsive to determining that the client supports the second protocol.

11. Logic encoded in a non-transitory, tangible computer readable medium for execution by a processor, and when executed operable to:
    receive a first transmit request from a first radio operable to communicate on a first channel employing a first protocol;
    concurrently receive a second transmit request from a second radio operable to communicate on a second channel employing a second protocol, wherein at least a portion of the second channel overlaps the first channel;
    prevent the first and second radios from transmitting over a medium concurrently responsive to one of the transmit request signals;
    enable one of the first or second radios to transmit and disable the other of the first or second radios to transmit responsive to concurrently receiving the first and second transmit request signals; and
    wait until after the first and second transmit requests from the first and second radios have both been de-asserted before selectively enabling the other of the first or second radios to transmit responsive to a re-assertion of the transmit request from the other of the first or second radios.

12. The logic set forth in claim 11, wherein the logic when executed is further operable to selectively enable a power amplifier of a selected radio that is selected from a group consisting of the first radio and second radio to enable the selected radio to transmit over the medium.

13. The logic set forth in claim 12, wherein the logic when executed is further operable to select the selected radio based on a round robin scheme.

14. The logic set forth in claim 12, wherein:
the first radio is associated with a first queue having a first priority, and the second radio is associated with a second queue having a second priority; and
the logic when executed is operable to select the selected radio based on a queue having a higher priority.

15. The logic set forth in claim 11, wherein the logic when executed is further operable to employ a carrier sense multiple access to prevent the first radio from transmitting while the second radio is receiving a packet.

16. The logic set forth in claim 11, wherein the logic when executed is further operable to:
determine whether a client communicating with the first radio supports the second protocol; and
suppress probe responses to the client on the first radio responsive to determining that the client supports the second protocol.

17. The apparatus set forth in claim 11, wherein the logic when executed is further operable to:
determine whether an associated client communicating with the first radio supports the second protocol; and
prevent the client from associating with the first radio responsive to determining that the associated client supports the second protocol.

18. A method, comprising:
receiving a first transmit request from a first radio operable to communicate on a first channel employing a first protocol;
concurrent with receiving the first transmit request from the first radio, receiving a second transmit request from a second radio operable to communicate on a second channel employing a second protocol, wherein at least a portion of the second channel overlaps the first channel;
preventing the first and second radios from transmitting over a medium concurrently by selectively enabling or disabling the radios responsive to the transmit request signal, the preventing comprising enabling one of the first or second radios to transmit and disabling the other of the first or second radios to transmit responsive to concurrently receiving the first and second transmit request signals; and
waiting until after both the first and second transmit requests from the first and second radios have been de-asserted before selectively enabling the other of the first or second radios to transmit responsive to a re-assertion of the transmit request from the other of the first or second radios.

19. The method of claim 18, wherein preventing the first and second radios from transmitting concurrently comprises waiting after the first radio has transmitted until transmit requests for both the first and second radios have completed before enabling the second radio to transmit.

\* \* \* \* \*